US009588011B1

(12) United States Patent
Shen et al.

(10) Patent No.: US 9,588,011 B1
(45) Date of Patent: Mar. 7, 2017

(54) SHIP RESISTANCE PREDICTION USING A TURBULENT SPOT INDUCER IN MODEL TESTING

(71) Applicants: Young T. Shen, Potomac, MD (US); Michael J. Hughes, Vienna, VA (US)

(72) Inventors: Young T. Shen, Potomac, MD (US); Michael J. Hughes, Vienna, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 186 days.

(21) Appl. No.: 14/706,333

(22) Filed: May 7, 2015

(51) Int. Cl.
*B63B 9/00* (2006.01)
*G01M 10/00* (2006.01)

(52) U.S. Cl.
CPC .................... *G01M 10/00* (2013.01)

(58) Field of Classification Search
None
See application file for complete search history.

(56) References Cited

U.S. PATENT DOCUMENTS 3,288,399 A * 11/1966 Gaster ..................... B64C 21/00
244/198
7,540,200 B2   6/2009 Yung et al.

OTHER PUBLICATIONS

P. Jagadeesh and K. Murali, "Investigations on Alternative Turbulence Closure Models for Axisymmetric Underwater Hullforms," The Journal of Ocean Technology, vol. 1, No. 2, pp. 37-57 (2006).
Jason Christopher Murphy, "A Novel Approach to Turbulence Stimulation for Ship-Model Testing," Trident Scholar Report No. 390 (2010), U.S. Naval Academy, Annapolis, Maryland, 88 pages (Nov. 5, 2010).
L. Krishnan and N.D. Sandham, "Effect of Mach Number on the Structure of Turbulent Spots," Journal of Fluid Mechanics, vol. 566, pp. 225-234, Cambridge University Press (2006).

(Continued)

*Primary Examiner* — Robert R Raevis
(74) *Attorney, Agent, or Firm* — Howard Kaiser

(57) ABSTRACT

Exemplary practice of the present invention provides and implements a superior small-scale test model of a full-scale vessel hull describing a smooth axisymmetric body. The boundary layer of a smooth axisymmetric body moving in water is characterized, in succession from front axial-longitudinal end to back axial-longitudinal end, by a laminar region, an unstable region, an intermittent region, and a turbulent region. The smooth axisymmetric body's intermittent region is characterized by generation of turbulent spots, which bring about the turbulent region. According to exemplary inventive practice, a "turbulent spot inducer" (ring-shaped structure or structural arrangement) is strategically sized and placed to increase generation of turbulent spots, thereby reducing (axially-longitudinally shortening) the intermittent region and enlarging (axially-longitudinally lengthening) the turbulent region. The turbulent spot inducer is circumferentially coupled with the smooth axisymmetric body at a location coinciding with the smooth axisymmetric body's delimitation between its unstable region and its intermittent region.

16 Claims, 16 Drawing Sheets

(56) References Cited

OTHER PUBLICATIONS

Jerome S. Parsons and Raymond E. Goodson, "Shaping of Axisymmetric Bodies for Minimum Drag in Incompressible Flow," Journal of Hydronautics, vol. 8, No. 3, pp. 100-107 (Jul. 1974).
Y. Shen, M. Hughes, and J. Gorski, "Resistance Prediction on Submerged Axisymmetric Bodies Fitted with Turbulent Spot Inducers," Journal of Ship Research, Society of Naval Architects and Marine Engineers (SNAME), vol. 59, No. 2, Jun. 2015, pp. 1-14 (appeared or available online: Apr. 22, 2015).
Fast Track Articles for Journal of Ship Research, Ingentaconnect website, http://www.ingentaconnect.com/content/sname/jsr/pre-prints;jsessionid=5qg20sst4gqps.victoria (3 pages; accessed on May 6, 2015).
Y. Shen, M. Hughes, and J. Gorski, "Resistance Prediction on Submerged Axisymmetric Bodies Fitted with Turbulent Spot Inducers," Journal of Ship Research, Society of Naval Architects and Marine Engineers (SNAME), vol. 59, No. 2, Jun. 2015, Abstract, Ingentaconnect website, http://www.ingentaconnect.com/content/sname/jsr/pre-prints/content-
JOSR140041;jsessionid=2k2f3n1r666qi.victoria (2 pages; accessed on May 6, 2015).
Journal of Ship Research publication web page, Ingentaconnect website, http://www.ingentaconnect.com/content/sname/jsr (4 pages; accessed on May 6, 2015).

\* cited by examiner

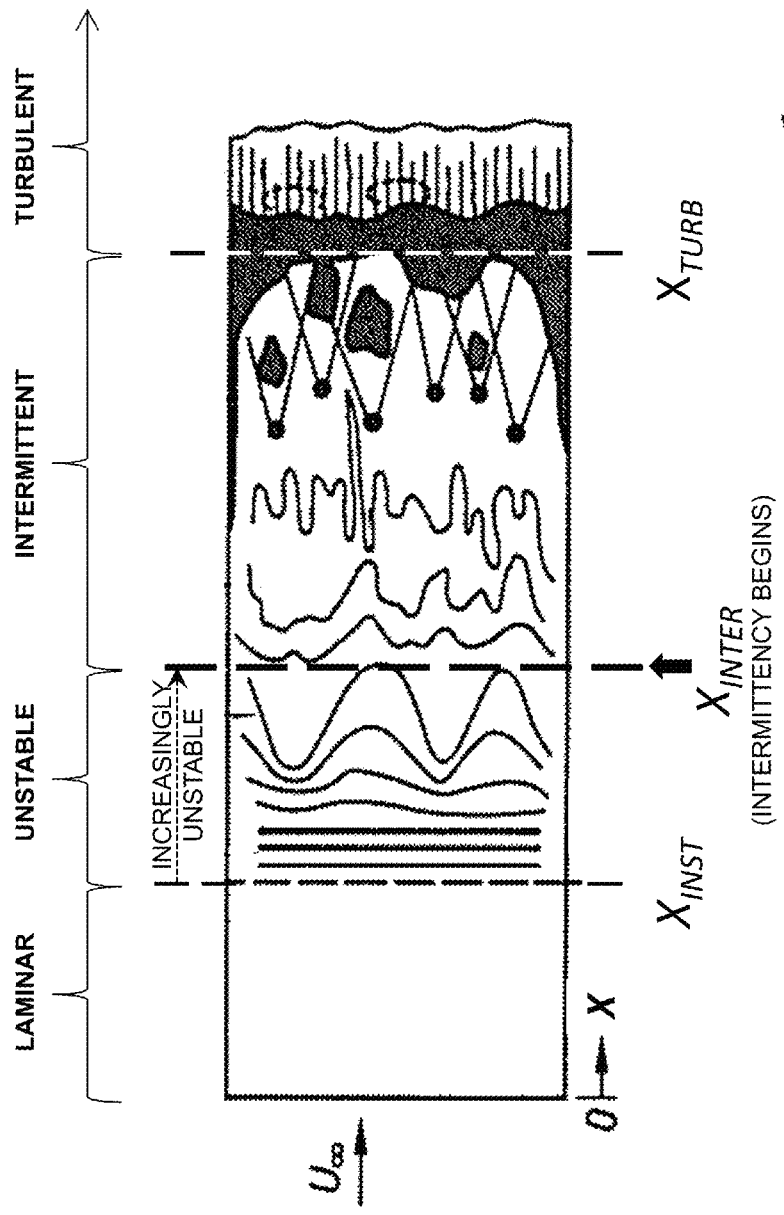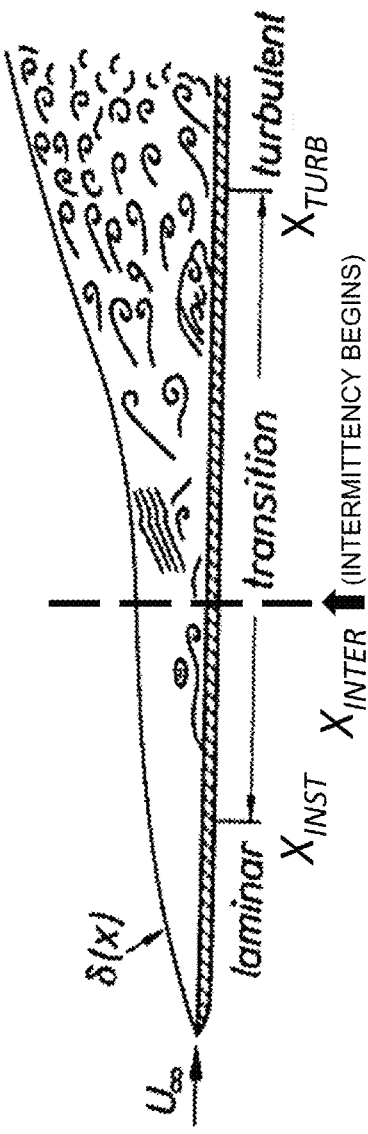
FIG. 5
FIG. 6

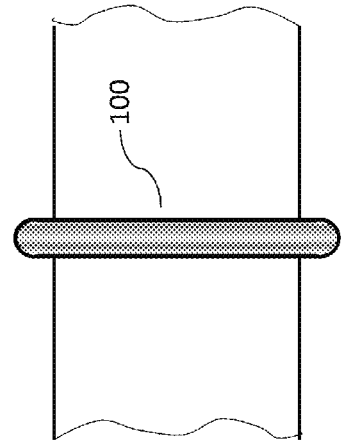
FIG. 14
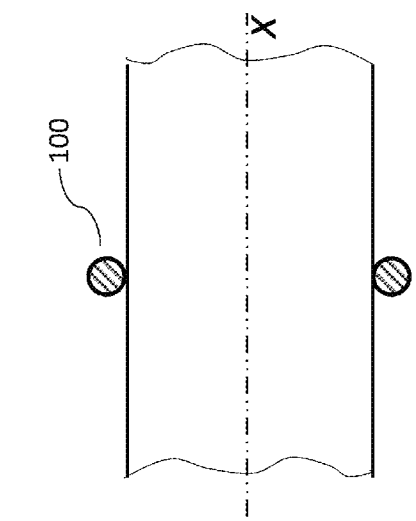
FIG. 15
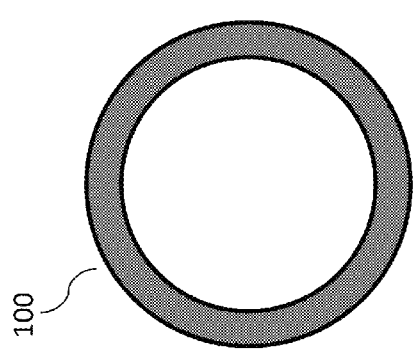
FIG. 16
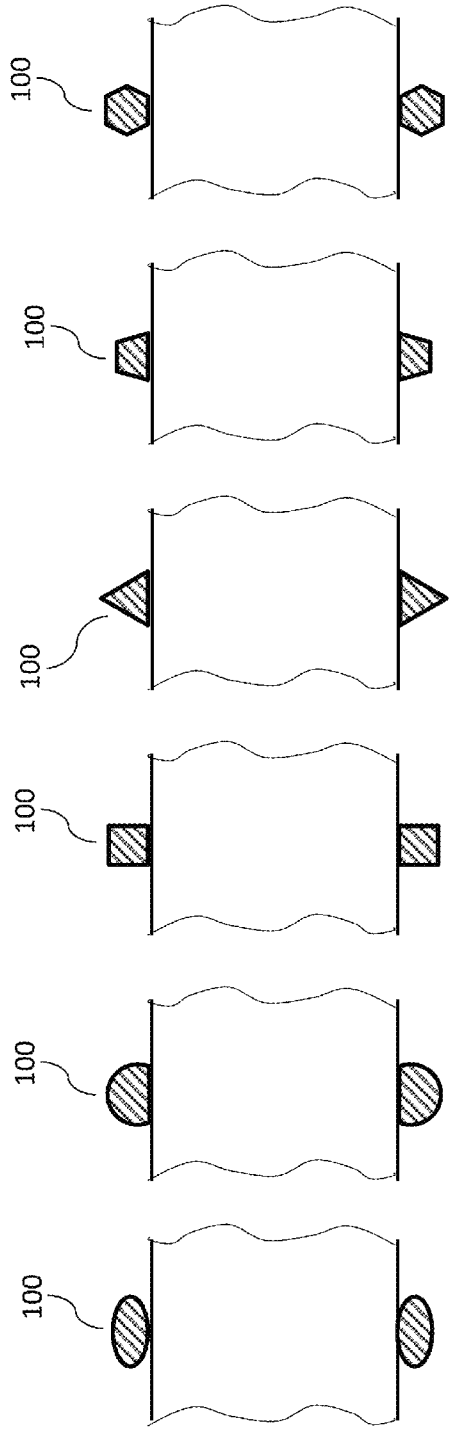
FIG. 17
FIG. 18
FIG. 19
FIG. 20
FIG. 21
FIG. 22

| CHARACTERISTIC | TRADITIONAL TURBULENCE GENERATION: TURBULENT STIMULATOR | INVENTIVE TURBULENCE GENERATION: TURBULENT SPOT INDUCER |
|---|---|---|
| Location | <ul><li>placed at 5% of body length from the nose</li><li>placed without consideration of model size, model geometry, and Re numbers in the model tests</li><li>located in a favorable pressure gradient</li></ul> | <ul><li>placed at the beginning of boundary layer (BL) intermittency;</li><li>BL intermittency depends on body geometry and Re number in model tests</li><li>flow is in an adverse pressure gradient</li></ul> |
| Shape(s) | sand strips; studs; grit (e.g., sand grains); Hama strips; trip wires | sand strips; studs; grit (e.g., sand grains); Hama strips; trip wires; projection strips |
| Size | <ul><li>typical size is 20 to 30 meshes</li></ul> | <ul><li>size is selected by satisfying $Re_k = 400$</li><li>turbulent BL is induced by natural transition through cultivation of turbulent spots</li></ul> |
| Parasitic Drag | <ul><li>equals approximately 3 to 4% of measured model resistance</li><li>estimated by testing the model at high carriage speeds, with and without turbulent stimulators</li><li>accuracy of this procedure to estimate parasitic drag has not been evaluated</li></ul> | <ul><li>calculated numerically by Equation (2)</li><li>equals approximately 0.2% of measured model resistance</li></ul> |

FIG. 34

SHIP RESISTANCE PREDICTION USING A TURBULENT SPOT INDUCER IN MODEL TESTING

BACKGROUND OF THE INVENTION

The present invention relates to hydrodynamic resistance of marine vessels such as surface ships and underwater ships, more particularly to methods and devices for conducting model testing of such vessels to predict such resistance.

Ship models are used to carry out hydrodynamic testing in tanks or basins. The model test data may be used, for instance, to design a new full-scale ship or to refine a design of an existing full-scale ship. The famous $19^{th}$ century engineer William Froude studied hull shapes and formulated the concept of the Froude number, which has since represented a standard for predicting performance of full-scale hulls based on results of model-scale testing.

A typical towing tank is equipped with a towing carriage running on two rails. Depending on the facility and the application, the towing carriage may tow a model or may follow a self-propelled model. A computer collects data and controls speed and/or other variables of the model. Model testing is commonly conducted in relation to resistance or propulsion, for instance to evaluate maneuverability, or powering requirements to attain certain speeds. A towing tank may also be equipped with a wave generator for simulating waves at sea.

Ship resistance greatly impacts design of propulsors and power plants as well as estimation of fuel costs. Due to complex flow around a ship, resistance prediction still relies on model tests and scaling formulae to relate model data to full scale performance prediction. Existing test methods for predicting ship resistance are based on use of "turbulence stimulators" to trigger turbulent boundary layers in ship models. In the marine industry, the technical issues associated with these conventional methods have been well discussed, and the accuracy of resistance predicted thereby is a source of significant concern.

A submerged craft such as a submarine typically includes a bare hull of an axisymmetric body, appendages such as rudders for maneuvering and control, and unique features specifically designed for each class of craft to operate (for instance, a layer of non-skid coating on a hull surface to prevent skid). Due to complex flow around a submerged craft, resistance prediction still relies heavily on model tests and scaling formulas to relate model data to full-scale performance prediction.

SUMMARY OF THE INVENTION

In view of the foregoing, an object of the present invention is to provide an improved methodology for predicting resistance of marine vessels such as surface ships, submarines, and submersibles.

In accordance with exemplary practice of the present invention, a vessel model is fabricated. The fabrication of the vessel model includes combining a smooth axisymmetric body and a turbulent spot inducer whereby, in a boundary layer transition zone (of the smooth axisymmetric body), the turbulent spot inducer encircles the smooth axisymmetric body so as to delineate between a boundary layer instability region (of the smooth axisymmetric body) and a boundary layer intermittency region (of the smooth axisymmetric body). The boundary layer transition zone separates a boundary layer laminarity region (of the smooth axisymmetric body) and a boundary layer turbulence region (of the smooth axisymmetric body). The vessel model is tested in a vessel model basin so that, during the testing of the vessel model, the turbulent spot inducer induces creation of turbulent spots in the boundary layer intermittency region, the turbulent spot inducer thereby diminishing the boundary layer intermittency region and augmenting the boundary layer turbulence region.

The present invention's novel test methodology for predicting ship resistance implements a novel test element referred to herein as a "turbulent spot inducer." In physical concept as well as design procedure, inventive implementation of a turbulent spot inducer is unique and differs markedly from conventional implementation of a turbulence stimulator. Exemplary inventive practice predicts ship resistance by fitting an axisymmetric body (e.g., ship model) with a turbulent spot inducer.

Boundary layer transition on a full scale ship occurs naturally through boundary layer instability. The present invention simulates this natural process by placing a turbulent spot inducer at a natural transitional location of a ship model. The transitional location availed of by inventive practice varies with model size, rest speed, and model body geometry. According to exemplary practice of the present invention, the locations and sizes of turbulent spot inducers will depend on model sizes, model profiles, and test Re numbers. The size of the turbulent spot inducer is determined based on boundary layer stability criterion of roughness Reynolds number of $Re_k=400$. The parasitic drag associated with the present invention is small and can be calculated with good accuracy.

The present invention represents a significant improvement in predicting ship resistance from model tests. As compared with existing methods, residual drag of a ship model can be obtained with improved accuracy by testing the model in accordance with the inventive method. Ship resistance can be predicted with greater confidence by implementing a turbulent spot inducer according to inventive practice, than can be predicted by implementing a turbulence stimulator according to conventional practice.

The following paper, which is coauthored by the present inventors and to some extent discloses the present invention, is hereby incorporated herein by reference: Y. Shen, M. Hughes, and J. Gorski, "Resistance Prediction on Submerged Axisymmetric Bodies Fitted with Turbulent Spot Inducers," *Journal of Ship Research*, Society of Naval Architects and Marine Engineers (SNAME), Volume 59, No. 2, June 2015, pages 1-14 (appeared or available online: 22 Apr. 2015).

BRIEF DESCRIPTION OF THE DRAWINGS

The present invention will now be described, by way of example, with reference to the accompanying drawings, wherein:

FIG. 1 illustrates four successive boundary layer regions on the smooth axisymmetric body, viz., a laminarity region, an instability region, an intermittency region, and a turbulence region.

FIG. 1 illustrates an example of a smooth axisymmetric body with respect to which the present invention's turbulent spot induction can be effected. FIGS. 2 through 4 illustrate an example of placement of a turbulent spot inducer at the beginning of the intermittency region, on the smooth axisymmetric body shown in FIG. 1.

FIGS. 5 and 6 are modified versions of diagrams contained in H. Schlichting, *Boundary-Layer Theory*, McGraw-Hill Book Company, New York, N.Y. (1979). FIGS. 5 and 6 are top and side views, respectively, of flow characteristics of a boundary layer on a flat plate. Similarly as shown in FIG. 1 with respect to an axisymmetric body, the four boundary layer regions shown in FIGS. 5 and 6 with respect to a flat plate are the laminarity region, the instability region, the intermittency region, and the turbulence region.

FIGS. 14 through 32 illustrate, by way of example, various types of annuli that may be suitable for inventive practice of a turbulent spot inducer. FIGS. 14 and 23 through 26 are through-axial views of various embodiments of an annulus. FIGS. 16 through 22 and 27 through 30 are axial-longitudinal views of various embodiments of an inventive annulus as coupled with an axisymmetric body; of these axial-longitudinal views, FIGS. 15, 17 through 22, and 27 are cross-sectional views. FIGS. 31 and 32 are axial-longitudinal views of two different embodiments of an annular arrangement of discrete objects, shown by way of example as sand (FIG. 31) or pins (FIG. 32).

FIG. 34 is a table comparing certain characteristics of traditional model testing of ship resistance versus inventive model testing of ship resistance.

DESCRIPTION OF EXEMPLARY EMBODIMENTS OF THE INVENTION

Figure 1:
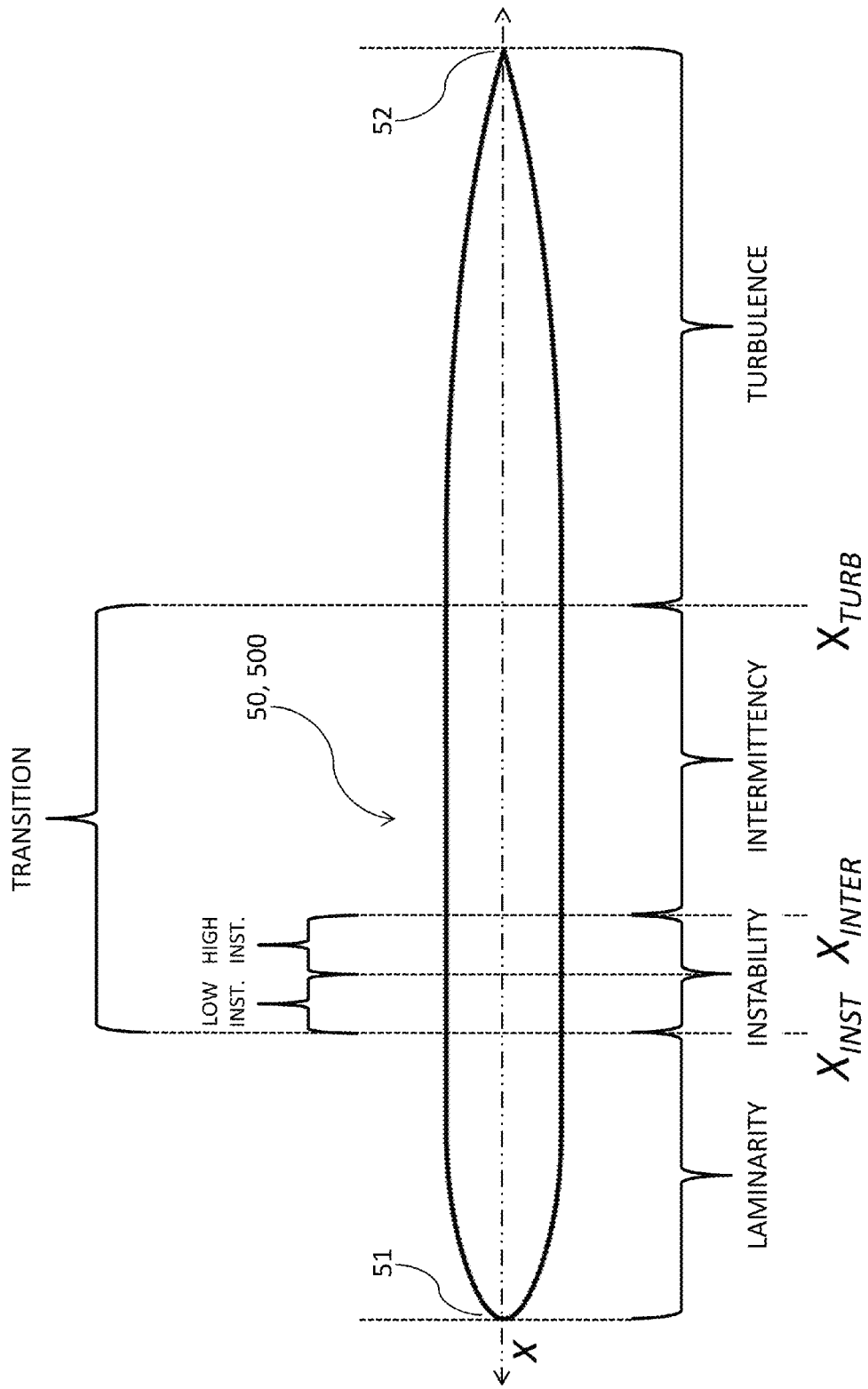
FIG. 1 is a diagrammatic axial-longitudinal view of a smooth axisymmetric body.

Reynolds numbers that are based on full-scale ship lengths are typically on the order of $5 \times 10^8$ to $5 \times 10^9$. At such high Reynolds numbers, boundary layer transition from laminar to turbulent will occur near the body nose of a full-scale ship, and practically the entire full-scale ship hull surface will be in a turbulent boundary layer. The turbulence region of a full-scale vessel thus extends approximately the entire length of the full-scale vessel.

In contrast, when vessel models are tested (e.g., using a carriage in a towing tank), their Reynolds numbers are typically one to two orders of magnitude less (depending on model sizes and model test speeds) than the Reynolds numbers occurring for the corresponding vessels at full scale. The region of laminar flow is significantly larger on a model surface than on a full-scale body surface. The resistance coefficients are significantly different in a laminar flow than in a turbulent flow.

Conventional Model Testing: Turbulence Stimulator

Conventional practice of model testing implements a "turbulence stimulator" (TS) in order to address this critical, resistance-related, scaling discrepancy between model vessels and full-scale vessels. Turbulence stimulators are currently used to obtain values for model residual drag $C_{RM}$. Turbulence stimulators are installed on models, and the models are thoroughly tested having the turbulence stimulators installed thereon.

Examples of turbulence stimulators that have been used in model testing are sand strips, studs (e.g., cylindrical studs), grit, Hama strips, and wires (e.g., cords or trip wires). A sand strip is similar to sandpaper. Grit is loose granular matter such as sand. A Hama strip is a strip having a serrated edge (e.g., an edge describing a pattern of adjacent wedges). For instance, a sand strip, Hama strip, or wire can encircle a body and be adhered thereto. Loose grains can be adhered to a body, or arrayed studs can be attached to a body.

The conventional approach to model testing implements a turbulence stimulator so as to reduce the length of the laminar flow region of the model vessel, thereby more accurately mimicking the completely extensive length of the turbulence region of the full-scale vessel. A turbulence stimulator serves to move the virtual origin of the turbulent boundary layer (BL) closer to the body nose, thereby minimizing the laminar BL effect on model resistance. Many reports and papers have been published with regard to TS performance and model resistance. See, e.g., J. Van Manen and P. Van Oossanen, *Resistance*, Volume 2, Principles of Naval Architecture, 1988.

There are significant problems associated with the turbulence stimulator methodology of model resistance testing. In typical current practice, a turbulence stimulator is placed at five percent (5%) of the body length from the nose. This 5% frontal axial-longitudinal placement is customarily done without consideration of model size, body geometry, test speeds, and model Reynolds number. Furthermore, the sizes of the turbulence stimulators used in a given test facility are typically selected based on practical experience gained in each laboratory, but without theoretical guidance.

In addition, a turbulence simulator will induce an extra drag on the resistance of a smooth body surface. This extra drag due to a turbulence stimulator is termed "parasitic drag." TS-induced parasitic drag depends on various factors including the location of the TS, the type of TS (e.g., sand roughness, studs, trip wire, etc.), the size of the TS, and the Reynolds number of the vessel model.

The surface ship community assumes that, in the first five percent (5%) of the body length, the parasitic drag is compensated by the difference in drag between (i) the laminar flow experienced in model testing and (ii) the turbulent flow experienced in full-scale vessel operation. Depending on factors such as carriage speed, model size, and TS size, this assumption of the surface ship community may be inaccurate to a significant degree.

In the underwater craft (e.g., submarine or submersible) community, the parasitic drag is estimated by the differential resistance of the model tested at high carriage speeds, with the TS versus without the TS. There is little or no evaluation in the literature regarding the accuracy of estimating parasitic drag in accordance with this differential resistance method. Recent studies conducted by the present inventors demonstrate that this differential resistance, prevalent in the underwater craft community, does not accurately represent parasitic drag.

A turbulence stimulator introduces extra drag, in addition to the primary drag exerted on a smooth body. This extra drag is termed "parasitic drag." A turbulence stimulator with a blunt face will block the flow and generate pressure drag. The parasitic drag of a turbulence stimulator can be computed from Equations (1) and (2).

Let $D_{trip}$ denote the parasitic drag due to the ring wire, $r_k$ the local body radius at the wire location, and $C_{trip}$ the wire drag coefficient. The parasitic drag due to this wire can be computed by $$D_{trip} = C_{trip}(1/2)\rho u_k^2(k2\pi r_k)\cos\alpha \quad (1)$$

where $\rho$ is the fluid density and $u_k$ is the laminar BL velocity at the roughness height k. The angle $\alpha$ defines the vector tangent to the body surface and the centerline. Experimental measurements on the wire drag coefficient give $C_{trip}=0.75$. The parasitic drag coefficient can be computed from Equation (2) by $$C_{Dtrip} = \frac{D_{trip}}{(1/2)\rho V^2 S_A} \quad (2)$$

where $S_A$ is the body surface area.

Inventive Model Testing: Turbulent Spot Inducer

As discussed hereinabove, conventional practice utilizes a "turbulence stimulator." In contrast, inventive practice utilizes a "turbulent spot inducer." The above-noted significant problems associated with conventional practice can be alleviated by inventive practice.

Referring now to FIGS. 1 through 4, exemplary practice of the present invention uniquely and efficaciously implements a "turbulent spot inducer." According to exemplary inventive practice, a turbulent spot inducer is a device that is implemented in such a manner as to induce the generation of turbulent spots in the boundary layer. The present invention is especially propitious for applications involving model testing of resistance and powering tests, as residual drag resistance can be obtained with improved accuracy for surface ship and submarine models. FIGS. 1 through 4 are merely illustrative and are not intended to be suggestive of dimensional preferences such as respecting sizes or proportions of boundary layer regions.

The present invention's turbulent spot inducer can be embodied similarly as have turbulence stimulators. For instance, a turbulent spot inducer can be embodied as a sand strip, an arrangement of studs (e.g., cylindrical studs), an area of grit, a Hama strip, or a wire (trip wire, cord, etc.). Since an annular (ring-like) structure is often preferred as constituting the present invention's turbulent spot inducer, the nature of the present invention's turbulent spot inducer can be expanded (vis-á-vis conventional practice of a turbulence stimulator) to include practically any annulus, smooth (having an even surface) or unsmooth (having an uneven surface). For instance, an unsmooth (unevenly surfaced) annulus may be a strip having a gritty material thereon (e.g., a sand strip), or a strip having projections therefrom (e.g., studs of cylindrical or other shapes). Use of an annulus having projections is not believed to be disclosed in the literature pertaining to turbulence stimulation.

Ship model 500 shown in FIG. 1 is "smooth" in the sense that it consists of smooth axisymmetric body 50 and is thus free of auxiliary structure. Boundary layer characteristics on a smooth model are shown in FIG. 1. Essentially the same boundary layer characteristics that exist on a smooth axisymmetric body surface may be simulated on a flat plate surface, such as shown in FIGS. 5 and 6. The flow starts with a laminar boundary layer in the vicinity of the nose of the axisymmetric body. The boundary layer becomes unstable with the bursting of turbulent spots in the transition zone due to inflow disturbance. With further growth in the numbers of turbulent spots, the boundary layer grows to become completely turbulent.

The flow between laminar and turbulent constitutes a transition zone that describes instability followed by intermittency. The velocity in a transition zone exhibits random fluctuation between laminar and turbulent flows. Theories to calculate friction drag in laminar flow and turbulent flow are well established and have been experimentally verified. Determination of friction drag in the instability region of a transition zone is also known. However, determination of friction drag in the intermittency region of a transition zone remains problematic.

Figure 2:
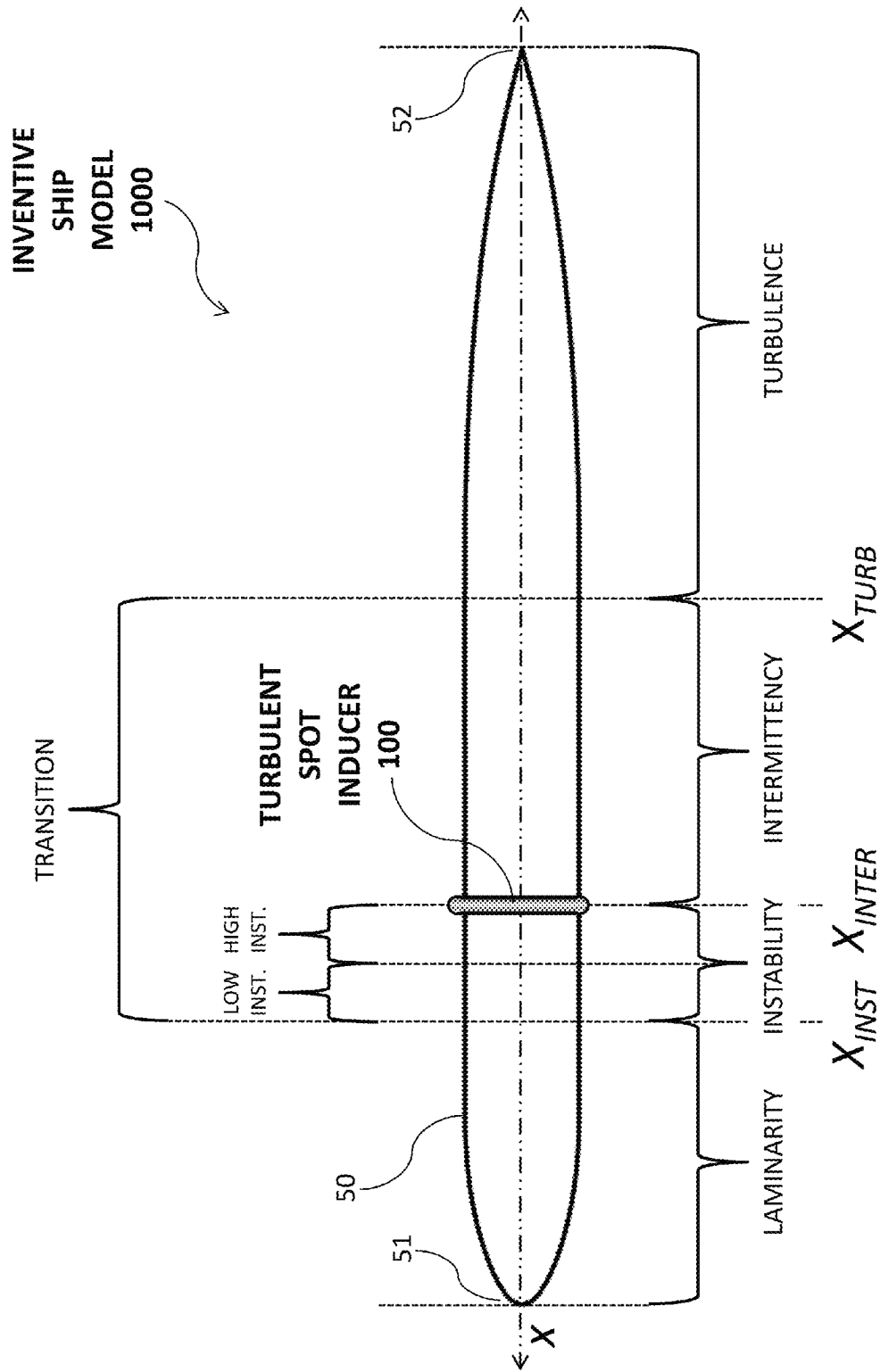
FIGS. 2 through 4 are views similar to the view of FIG. 1, and are illustrative of exemplary practice of the present invention.
Figure 3:
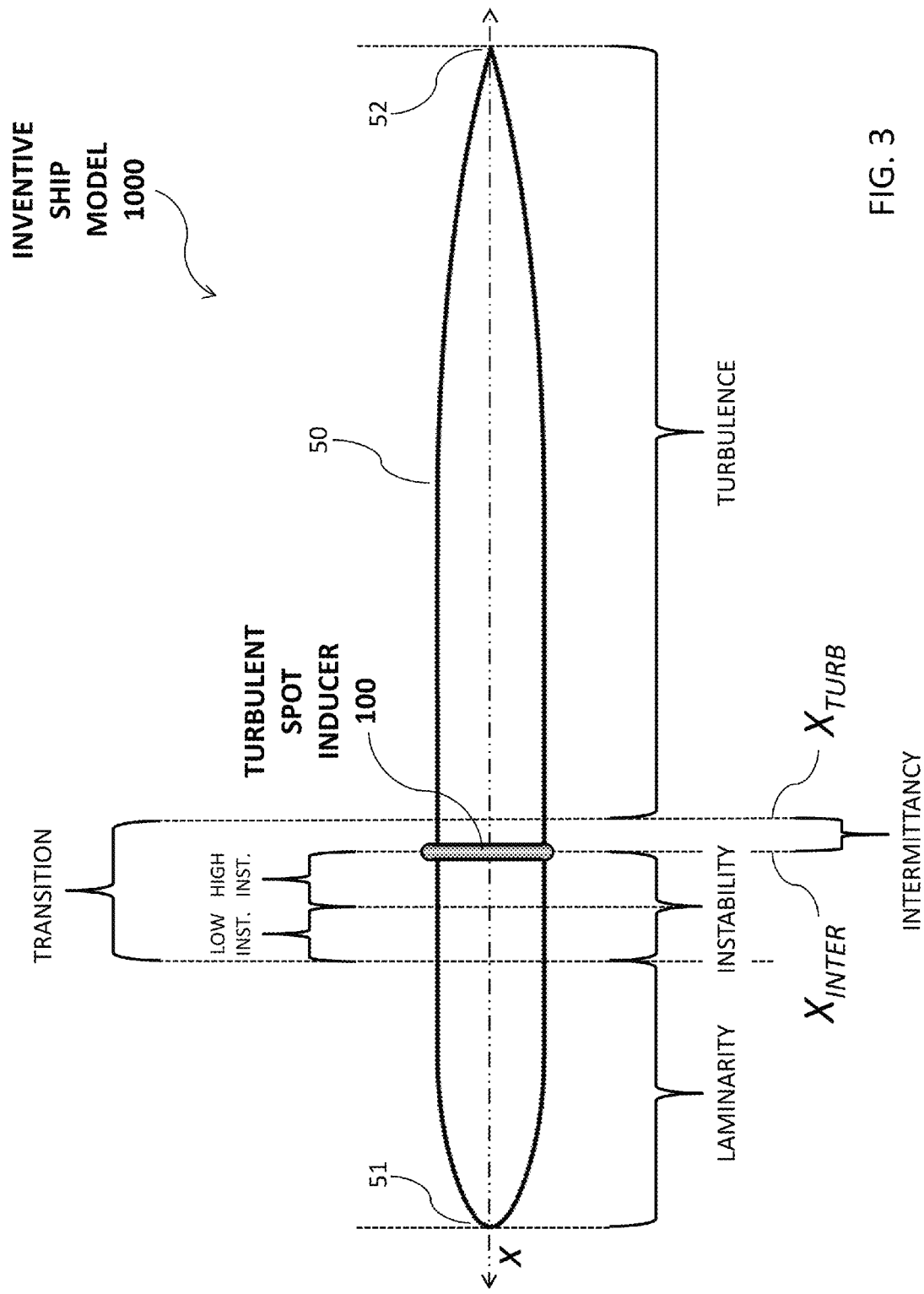
Figure 4:
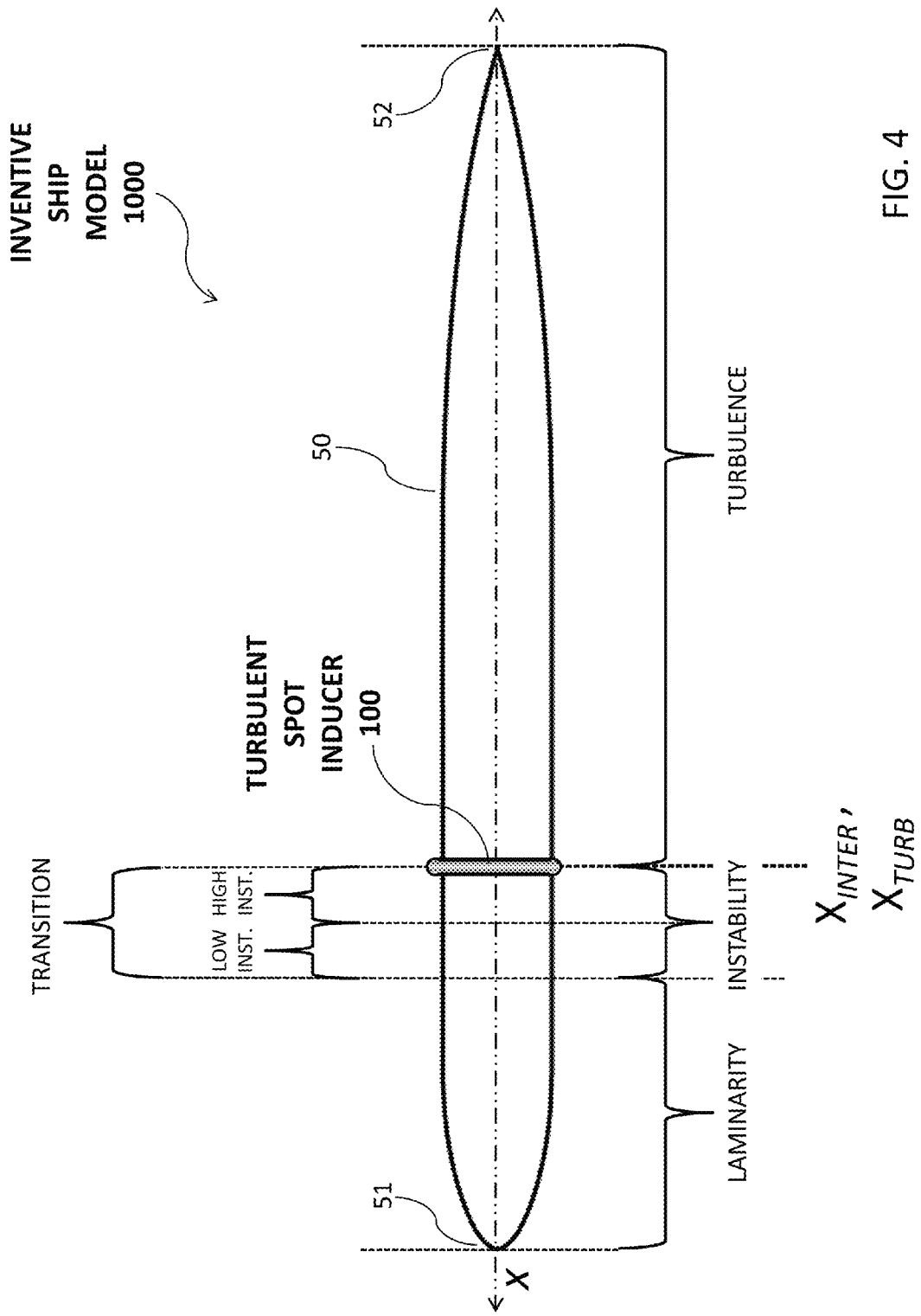
Figure 7:
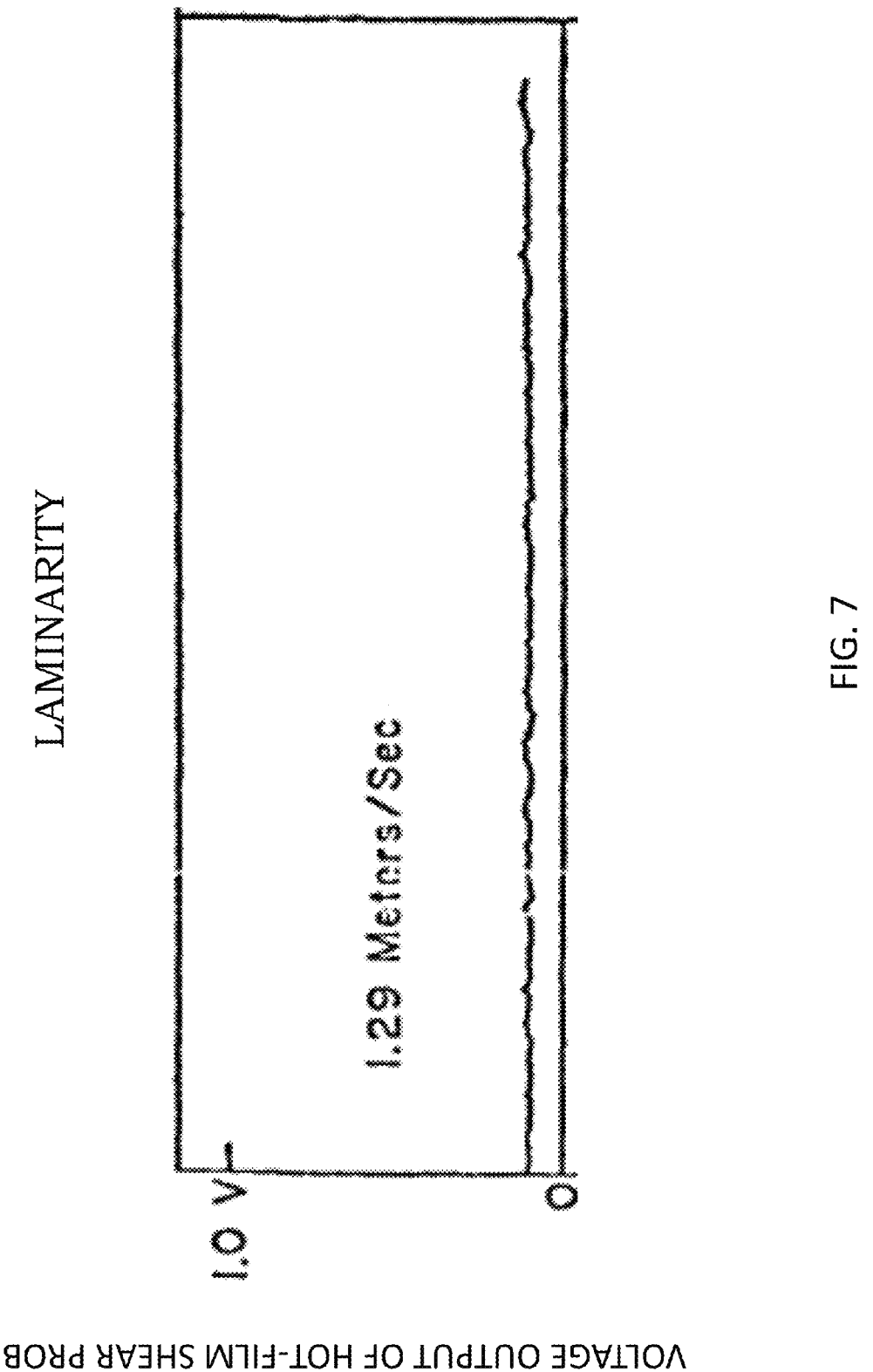
FIGS. 7 through 11 are modified versions of diagrams contained in J. Power, "A Comparison between Measured and Computed Locations of Transition on Nine Forebodies of Revolution," V-4 Low-Speed Boundary Layer Transition Workshop, Santa Monica, Calif. (September 1976). In comportment with FIGS. 1 through 6, FIGS. 7 through 11 illustrate four boundary layer regions on an axisymmetric body viz.: the laminarity region (FIG. 7); the instability region (low instability sub-region shown in FIG. 8; high instability sub-region shown in FIG. 9); the intermittency region (FIG. 10); and, the turbulence region (FIG. 11) on an axisymmetric body.
Figure 8:
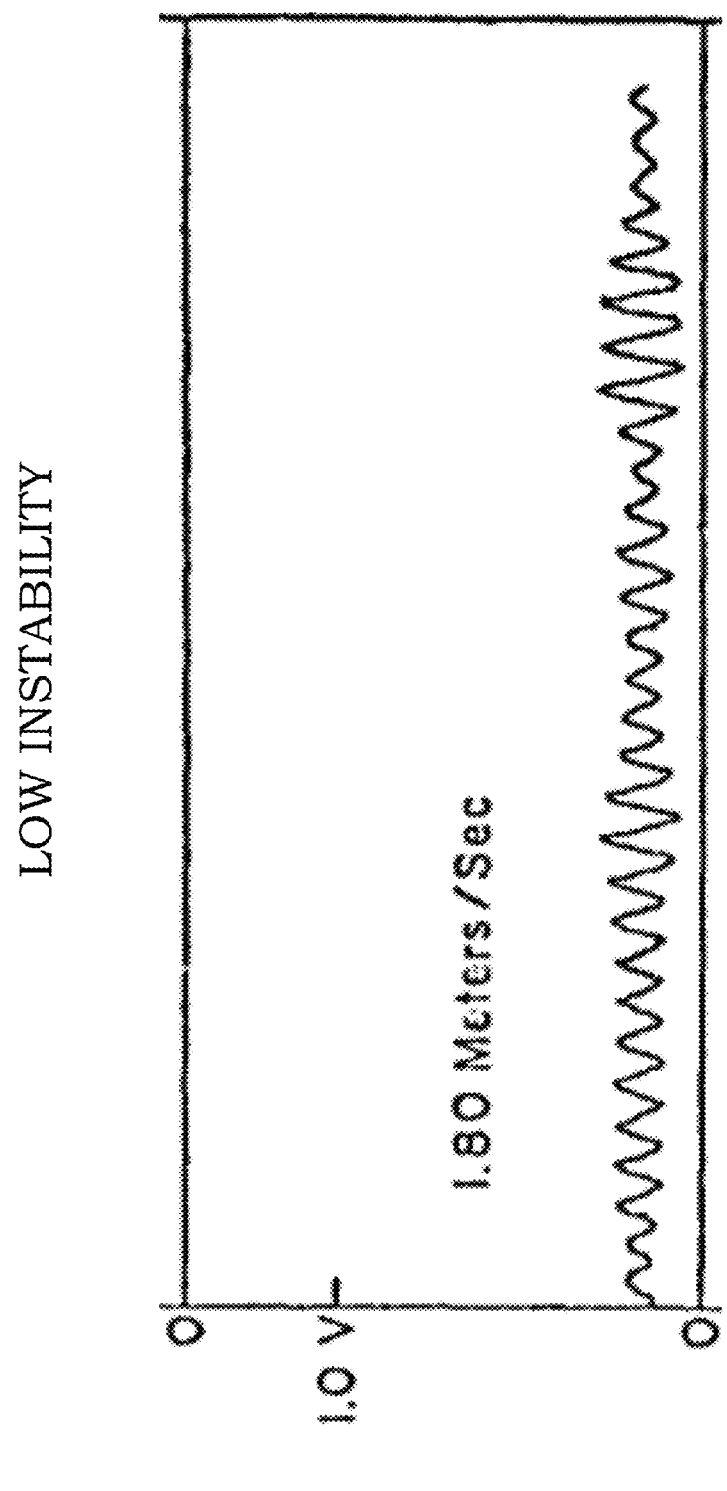
Figure 9:
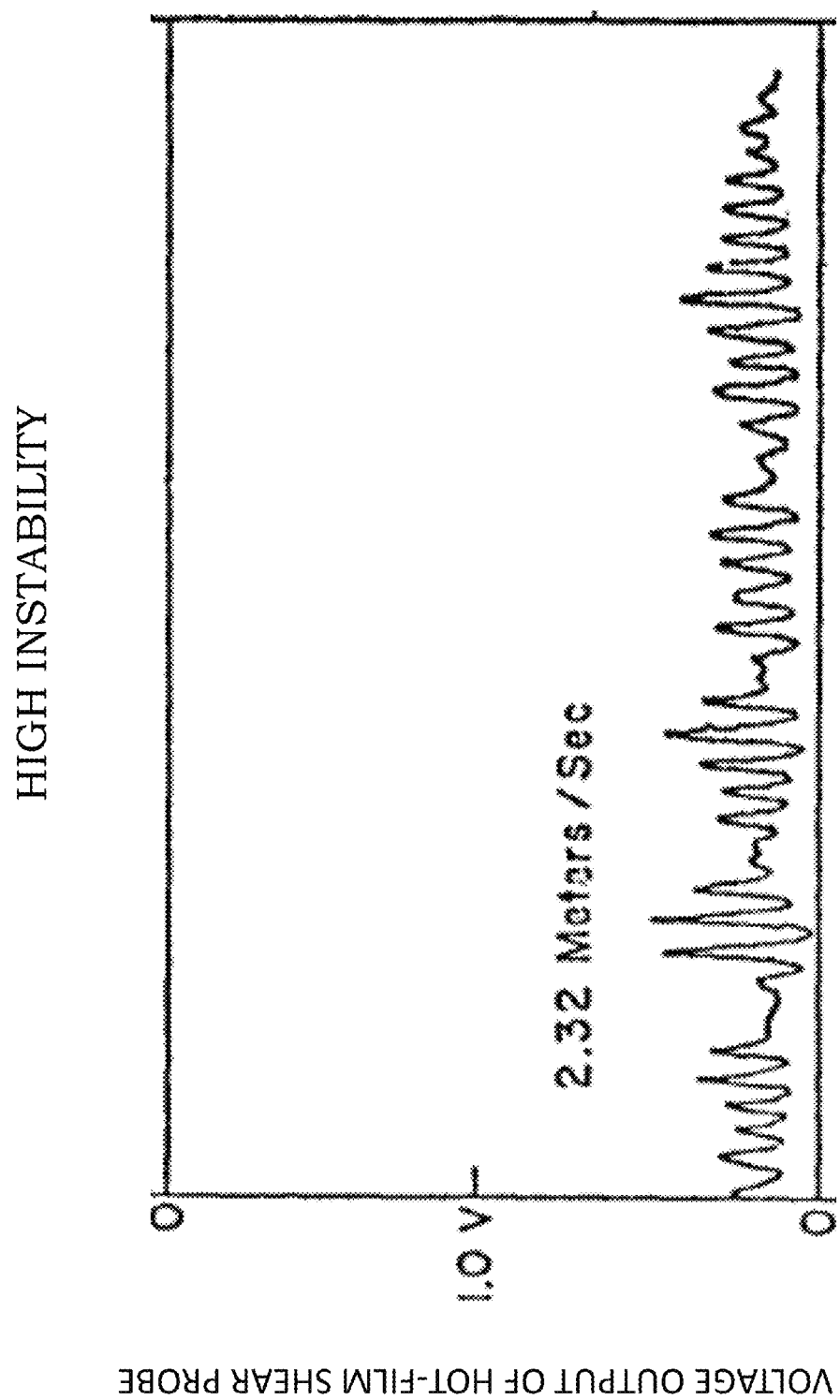
Figure 10:
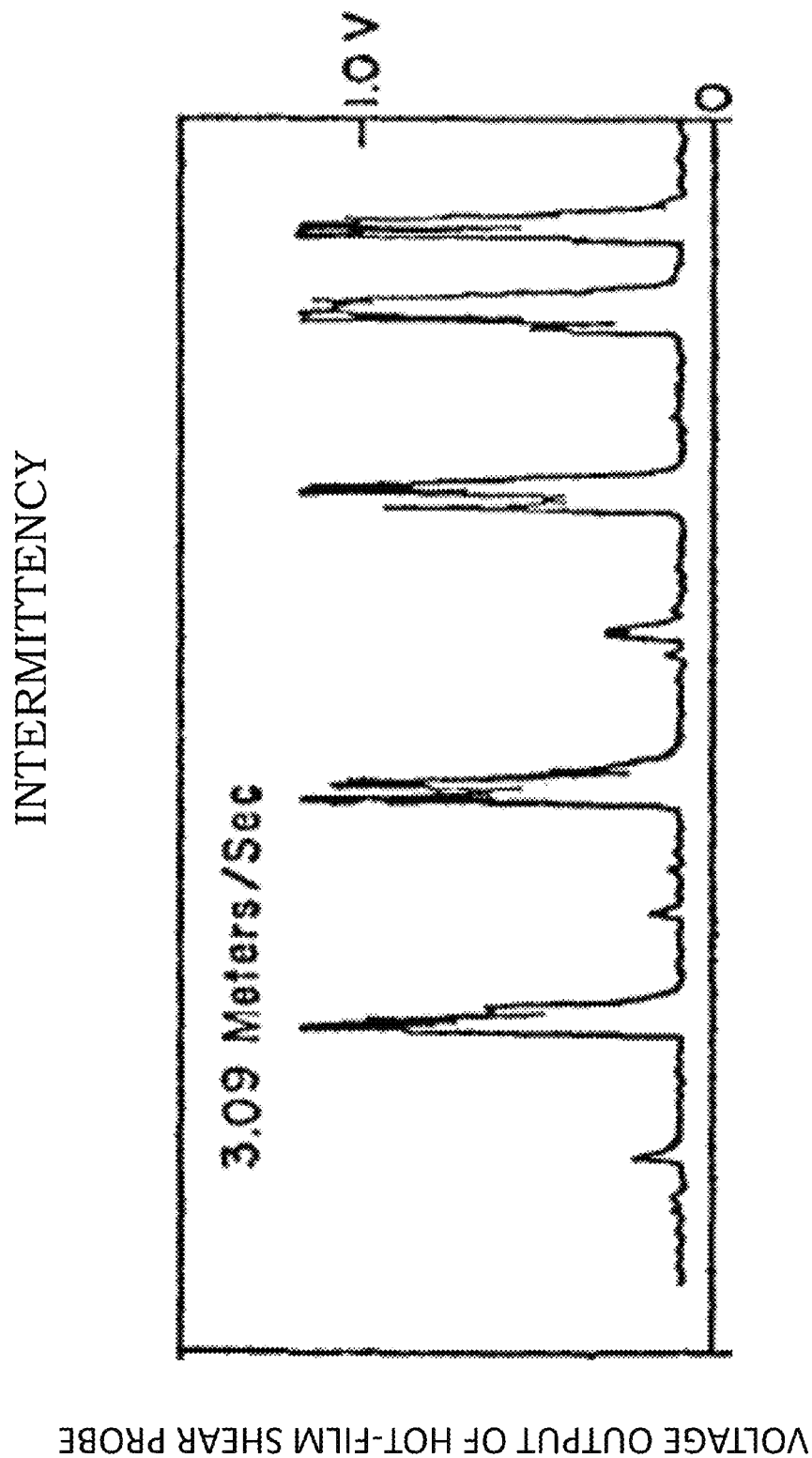
Figure 11:
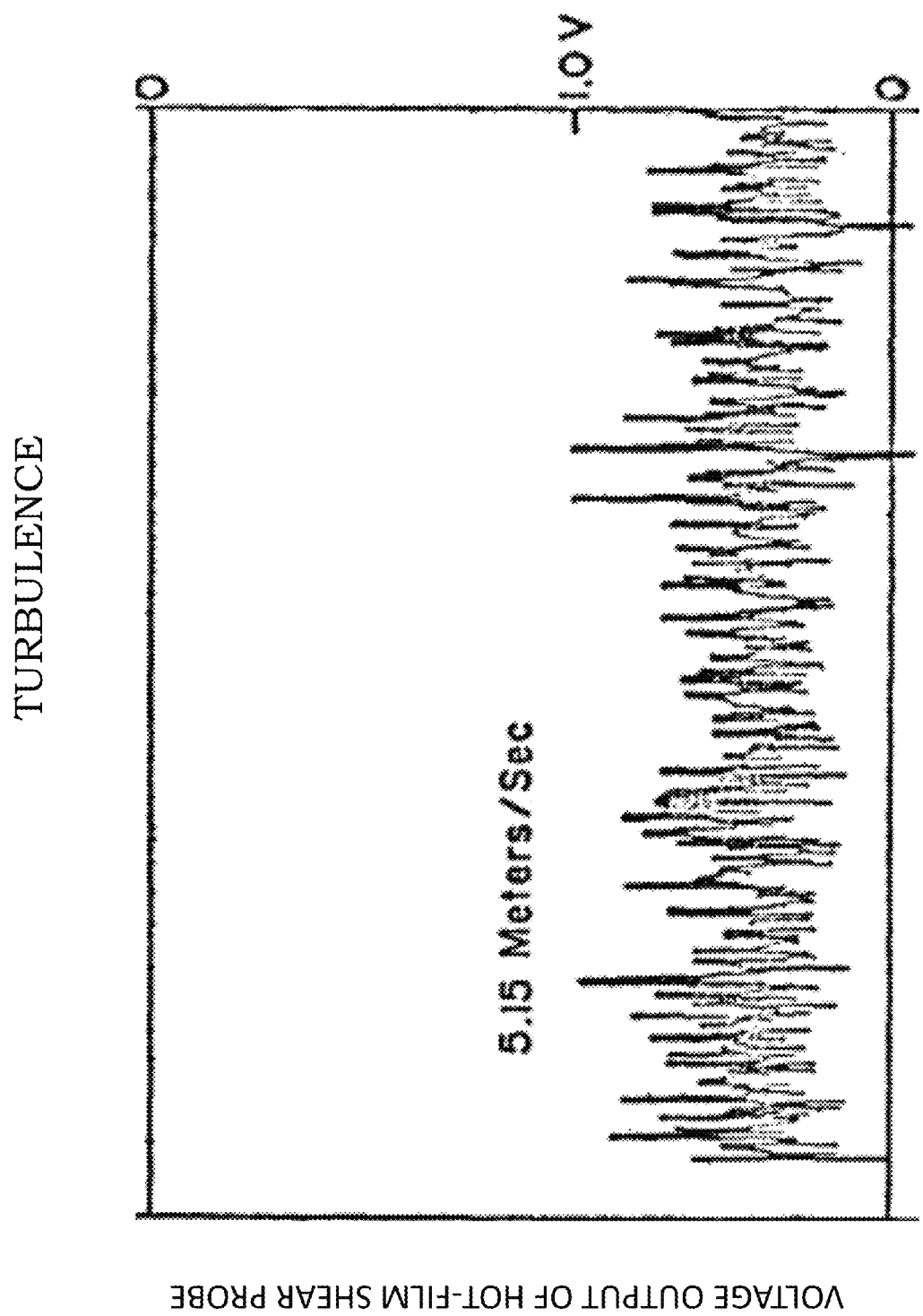

As shown in FIGS. 2 through 4, the present invention introduces a turbulent spot inducer 100 on the model 50 surface so as to substantially reduce or practically eliminate the intermittency region of the transition zone, thereby alleviating traditional computational difficulties associated with the intermittency region. The present invention's turbulent spot inducer 100 is a unique type of boundary layer stimulator, for it enhances the growth of turbulent spots and thereby attenuates the intermittency region. According to exemplary inventive practice, a turbulent spot inducer 100 is situated at the beginning of the intermittency region of the boundary layer.

FIG. 2 shows the original placement of a turbulent spot inducer 100 on the smooth axisymmetric body 50 shown in FIG. 1. FIGS. 3 and 4 depict the turbulent spot inducer placed as shown in FIG. 2, and examples of consequent change that occurs in the boundary layer regionalization on the smooth axisymmetric body. The reduction (e.g., as shown in FIG. 3) or minimization (e.g., as shown in FIG. 4) of the intermittency region is associated with the placement of the turbulent spot inducer 100 on the smooth axisymmetric body 50 at the beginning of the intermittency region.

As shown in FIGS. 1 and 2, smooth axisymmetric elongate body 50 is characterized by a geometric axis x, a front tip 51, and a back tip 52. Body 50 is perpendicularly intersected at different points along the x-axis by corresponding geometric vertical planes that delimit different regions of the boundary layer. Each vertical plane demarcates a phase change in the nature of the fluid flow in the x-axial direction along the surface of the smooth body 100. The four main regions of boundary layer fluid flow are, in order: the Laminarity Region; the Instability Region; the Intermittency Region; and, the Turbulence Region. The boundary layer transition zone (super-region) encompasses the boundary layer instability region and the boundary layer intermittency region.

Considering body 50 in the axial direction from front tip 51 to back tip 52 (left-to-right as shown in FIGS. 1 through 4), boundary layer laminarity ends and boundary layer instability begins at vertical plane $X_{INST}$. Boundary layer instability ends and boundary layer intermittency begins at vertical plane $X_{INTER}$. Boundary layer intermittency ends and boundary layer turbulence begins at vertical plane $X_{TURB}$. Otherwise expressed, vertical plane $x_{INST}$ is the demarcation between BL laminarity and BL instability. Vertical plane $X_{INTER}$ is the demarcation between BL instability and BL intermittency. Vertical plane $X_{TURB}$ is the demarcation between BL intermittency and BL turbulence.

FIGS. 5 and 6 are top and side views, respectively, of flow characteristics of a boundary layer on a flat plate. FIGS. 7 through 11 are graphs indicative of measured pressure signals with respect to a boundary layer on an axisymmetric body. Each graph in FIGS. 7 through 11 represents a region (or part of a region) of the boundary layer. The flow on a flat plate as represented in FIGS. 5 and 6 is similar to the flow on an axisymmetric body as represented in FIGS. 7 through 11.

In both the flat plate example of FIGS. 5 and 6 and the axisymmetric body example of FIGS. 7 through 11, the flow exhibits laminar flow, followed by instability (e.g., wave-like disturbance), followed by intermittency, and followed by turbulent flow. The intermittency region precedes full turbulence and is characterized by successions of laminar and turbulent flows in random sequences; that is, the turbulent spots occur randomly in the intermittency region.

Boundary layer intermittency begins at demarcation $X_{INTER}$, which is located in the boundary layer transition zone and represents the beginning of the boundary layer intermittency region. According to exemplary inventive practice, turbulent spot inducer 50 is placed at demarcation $X_{INTER}$, such as shown in FIG. 2. The location of demarcation $X_{INTER}$ in terms of Reynolds numbers can be measured or calculated.

Figure 12:
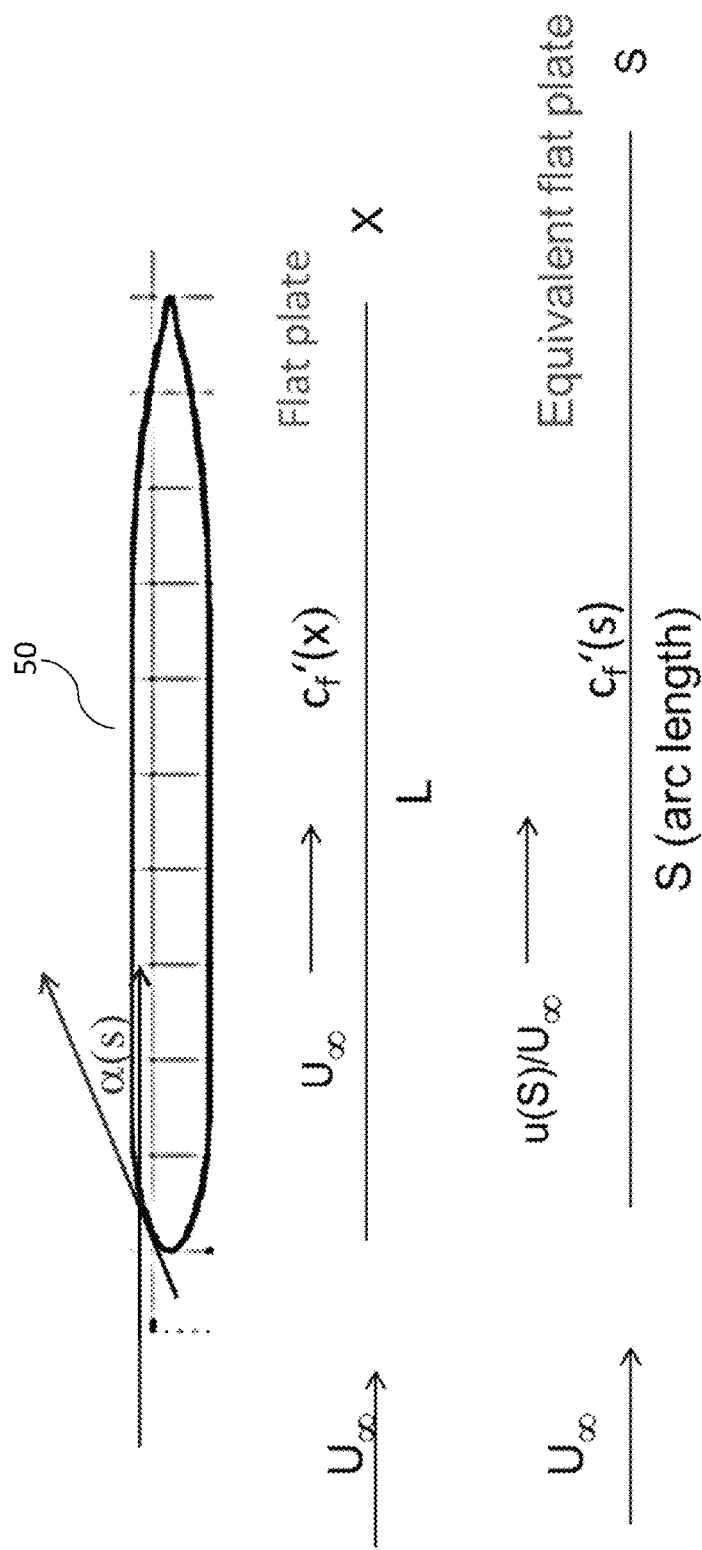
FIG. 12 is a diagram illustrating how boundary layer analysis with respect to an axisymmetric body can be equivalent to boundary layer analysis with respect to a flat plate.

With reference to FIG. 12, consider a flat plate with length L placed in a uniform flow U. The skin friction coefficient is $c_f$. It is assumed that flow becomes turbulent at the leading edge of the plate; in other words, the boundary layer on the entire plate is turbulent. There is no pressure gradient along the plate, and the outer flow outside the BL is constant and equal to free stream speed U along the entire plate. Further, consider a body with an arc length S from the nose to the stern, wherein arc length S is greater than an equivalent flat plate length L. The local arc length is denoted by s. The free stream velocity is still U, but the local flow velocity on a body surface is now denoted by u(s), which is different from the free stream velocity U.

Known methods and techniques for empirically ascertaining the transformational configuration of a boundary layer include: (i) hot films; (ii) pressure transducers; (iii) shear stress sensors; and, (iv) paint observation. An example of a method to measure boundary layer transition is disclosed by Power (1976), who conducted a series of model tests to measure transition on nine axisymmetric bodies. The extents of the laminar, transitional and turbulent flow regimes were determined by qualitative analysis from several constant temperature hot films flush mounted on each body surface. Representative hot film signals for various flow regimes are shown in FIGS. 7 through 11. See J. Power, "A Comparison between Measured and Computed Locations of Transition on Nine Fore-Bodies of Revolution," V-4 Low-Speed Boundary Layer Transition Workshop" Santa Monica, Calif., September 1976.

Instead of using a measurement approach, a boundary layer configuration can be calculated theoretically, such as by a computational method developed by the present inventors that avails itself of theories of flow instability. Many commercial codes are available (such as VSAERO software, manufactured by Analytical Methods, a division of Stark Aerospace, Inc., Kirkland, Wash.) that may be used to calculate BL transition in accordance with the inventive computational method. Let us assume that L denotes body length, V denotes ship/model speed, and $\nu$ denotes fluid viscosity. The Reynolds number Re is defined by $$Re = VL/\nu \qquad (3)$$

Figure 13:
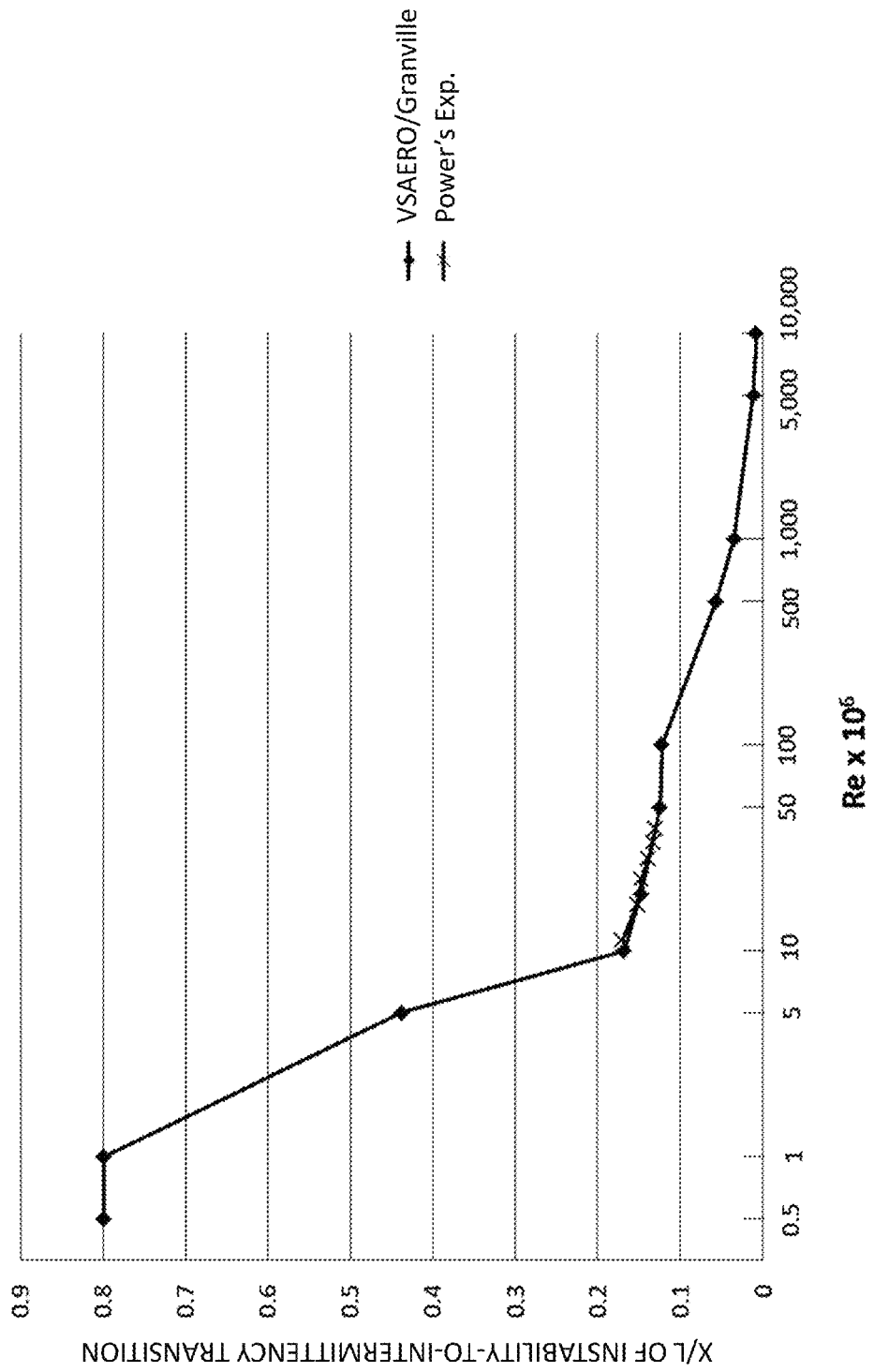
FIG. 13 is a graph showing computed and measured boundary layer transition locations on a ship model. A first plot represents BL transitions calculated using VSAERO software. A second plot represents BL transitions measured using Power's measurement method illustrated in FIGS. 7 through 11.
Figure 32:
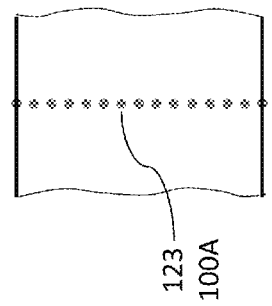

With reference to FIG. 13, let X denote a local distance from the body nose (tip) with X=0 at the body nose. By way of example, FIG. 13 compares respective plots of the transition locations of X/L at different Reynolds numbers: (i) calculated using the VSAERO computer code; and (ii) determined from experimental data. In FIG. 13, transition locations calculated in relation to Re are contradistinguished from measured experimental data. FIG. 13 demonstrates that model BL transition locations can be predicted numerically with good accuracy. As FIG. 13 clearly illustrates, the locations of BL transition vary with Re numbers, body sizes, and carriage speeds.

According to exemplary inventive practice, the location of a turbulent spot inducer is selected to be at the BL instability-to-intermittency transition location, that is, at the beginning of the BL intermittency region. The location of BL transition from instability to intermittency is related to Reynolds numbers, model sizes, and carriage speeds. Therefore, inventive placement of a turbulent spot inducer is performed with consideration of model sizes, carriage speeds, and Reynolds numbers. In contrast to inventive practice, conventional practice regularly places a turbulence stimulator at the same location, viz., at 5% length from the body nose. Traditional placement of a turbulence stimulator is performed without consideration of model sizes, carriage speeds, and Reynolds numbers.

With reference to FIGS. 14 through 30, multifarious shapes, sizes, and profiles of turbulent spot inducer 100 are possible in inventive practice. According to exemplary inventive practice, a turbulent spot inducer is an annular structure. Inventive practice is also possible whereby a turbulent spot inducer is in the form of plural discrete structural elements describing an annular geometric shape. The discrete elements of an annular elemental arrangement can include, for instance, gritty material (e.g., sand) or projections (e.g., studs), directly adhered or attached to the smooth axisymmetric body so as to describe an annular geometric shape. As distinguished from an annular arrangement of discrete elements such as sand or studs, an annulus is an integral or unitary annular structure such as a ring or strip.

The terms "annular structure" and "annulus" are used synonymously herein to broadly refer to a unitary or integral object having an annular shape (e.g., ring-shaped or band-shaped). As depicted in FIGS. 15 through 22 and 27 through 30, annular structure 100 closely encircles axisymmetric body 50. Annular structure 100 is adherently, circumscriptively, and contiguously placed around the circular circumference of axisymmetric body 50 surface so as to lie in a geometric plane that is perpendicular to axis x of axisymmetric body 50.

A turbulent spot inducer 100 can be embodied, for instance, as a ring-shaped wire, e.g., a wire that is circular in cross-section and is circularly configured to describe a ring, such as shown in FIGS. 14 through 16. Trip wires may be propitiously used for forming a turbulent spot inducer 100, as generally trip wires have precisely defined geometries and are easily installed and removed. Other examples of annuli that may be suitable for inventive implementation as a turbulent spot inducer are shown in FIGS. 17 through 30. By way of example, the cross-section of the circularly shaped wire can be oval/elliptical (FIG. 17), truncated circular (FIG. 18), rectangular/square (FIG. 19), triangular (FIG. 20), trapezoidal (FIG. 21), or hexagonal (FIG. 22). FIG. 14 may be considered to be representative of the circular cross-sectional annulus shown in FIG. 15 or of the various non-circular cross-sectional annuli shown in FIGS. 17 through 22.

Figure 24:
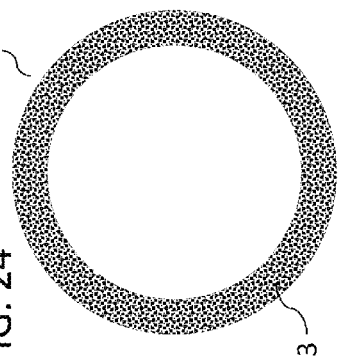
Figure 23:
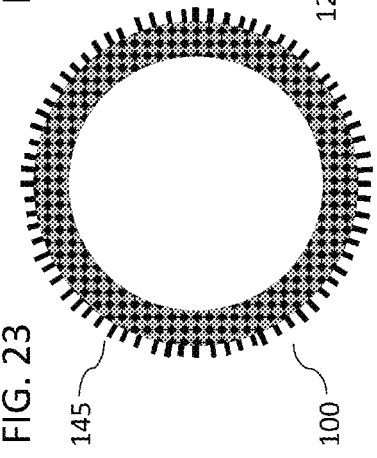
Figure 30:
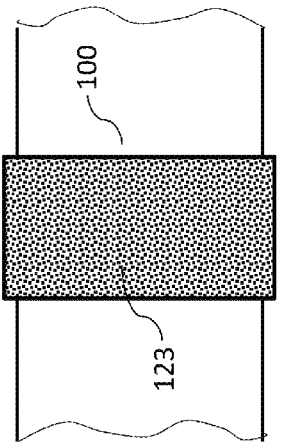
Figure 26:
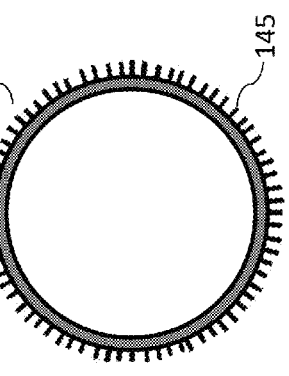

Depending on the inventive embodiment, turbulent spot inducer 100 can be embodied, for instance, as a "smooth" annulus or a "rough" annulus. Examples of annular structure 100 having a frictional surface character include a ring or strip having gritty material 123 (e.g., a sand ring/strip) such as shown in FIGS. 24 and 30, or a ring or strip having projections 145 (e.g., a "studded" ring/strip) such as shown in FIGS. 23 and 26). Annuli 100 as shown in FIGS. 27 through 30 are configured as relatively thin, relatively wide strips that may be formed of adhesive tape, for instance, and may have a smoother surface character (e.g., as shown in FIG. 28) or a rougher surface character (e.g., as shown in FIG. 30).

Figure 31:
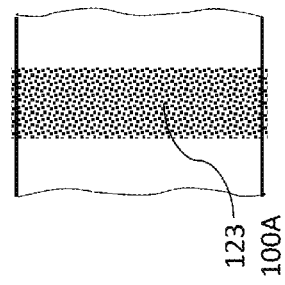
Figure 28:
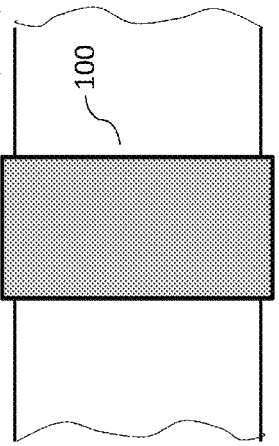
Figure 27:
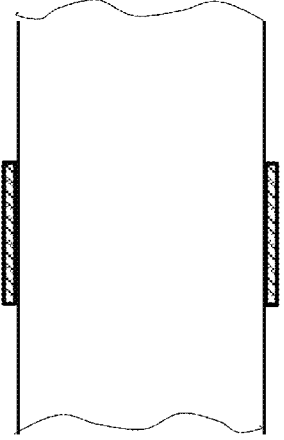
Figure 25:
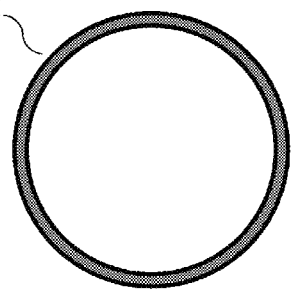
Figure 29:
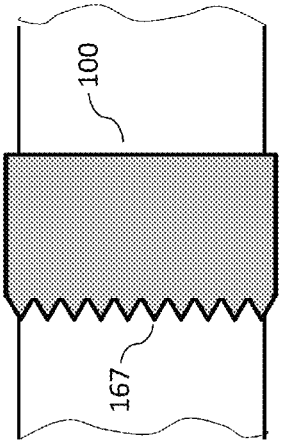

FIGS. 28 and 30 are each representative of an annulus 100 that describes a thin wide strip having straight parallel edges; FIG. 28 shows a smooth strip and FIG. 30 shows a rough strip. FIG. 29 is representative of an annulus 100 that describes a Hama-like strip having a saw-tooth edge 167. FIGS. 31 (gritty material) and 32 (projections) show two examples of a turbulent spot inducer 100a, describing an annular arrangement of small structural elements that are attached to (e.g., adhered or fastened) a smooth axisymmetric body 50.

An inventive practitioner seeks to provide a model-scale vessel 1000 having boundary layer dynamics corresponding to those of the full-scale vessel. Once the inventive practitioner determines the instability-to-intermittency delimitation of the boundary layer on a smooth axisymmetric body 50, he/she selects an annulus 100 having optimal geometric attributes for minimizing the extent of the intermittency region and hence maximizing the extent of the turbulence region. Size (e.g., in terms of ring diameter k), shape, and surface quality (evenness/unevenness, having protrusions, etc.) of annulus 100 are among the characteristics of annulus 100 that affect its suitability for inventive implementation as a turbulent spot inducer.

Prior to BL transition, the flow along the surface in the axially front part of a smooth axisymmetric body 50 is laminar. The laminar BL profile and BL velocity distributions have been theoretically derived by Blasius and have been experimentally verified. The Blasius laminar flow theory is disclosed in textbooks on fluid mechanics and is well known by engineers working in the marine industry.

Let k denote the diameter of the ring wire 100. Let $u_k$ denote the BL flow velocity at the height of the ring wire diameter k. Let $Re_k$ denote the roughness Reynolds number defined by $Re_k = k u_k / \nu$, where $\nu$ is the fluid viscosity. Well disclosed in the literature are studies of turbulence stimulators on effects of roughness heights with respect to stimulation of turbulent BL. The roughness Reynolds number $Re_k$ for a turbulent spot inducer placed at the beginning of the intermittency region is found by the present inventors to be approximately $Re_k = 400$.

Let y denote a local vertical distance above the body surface in the BL at a local distance x from the body nose. Let u denote a local velocity at the vertical distance y inside the Blasius laminar BL. A dimensionless coordinate $\eta$ is defined by $$\eta = y\sqrt{V/\nu x} \quad (4)$$

Figure 33:
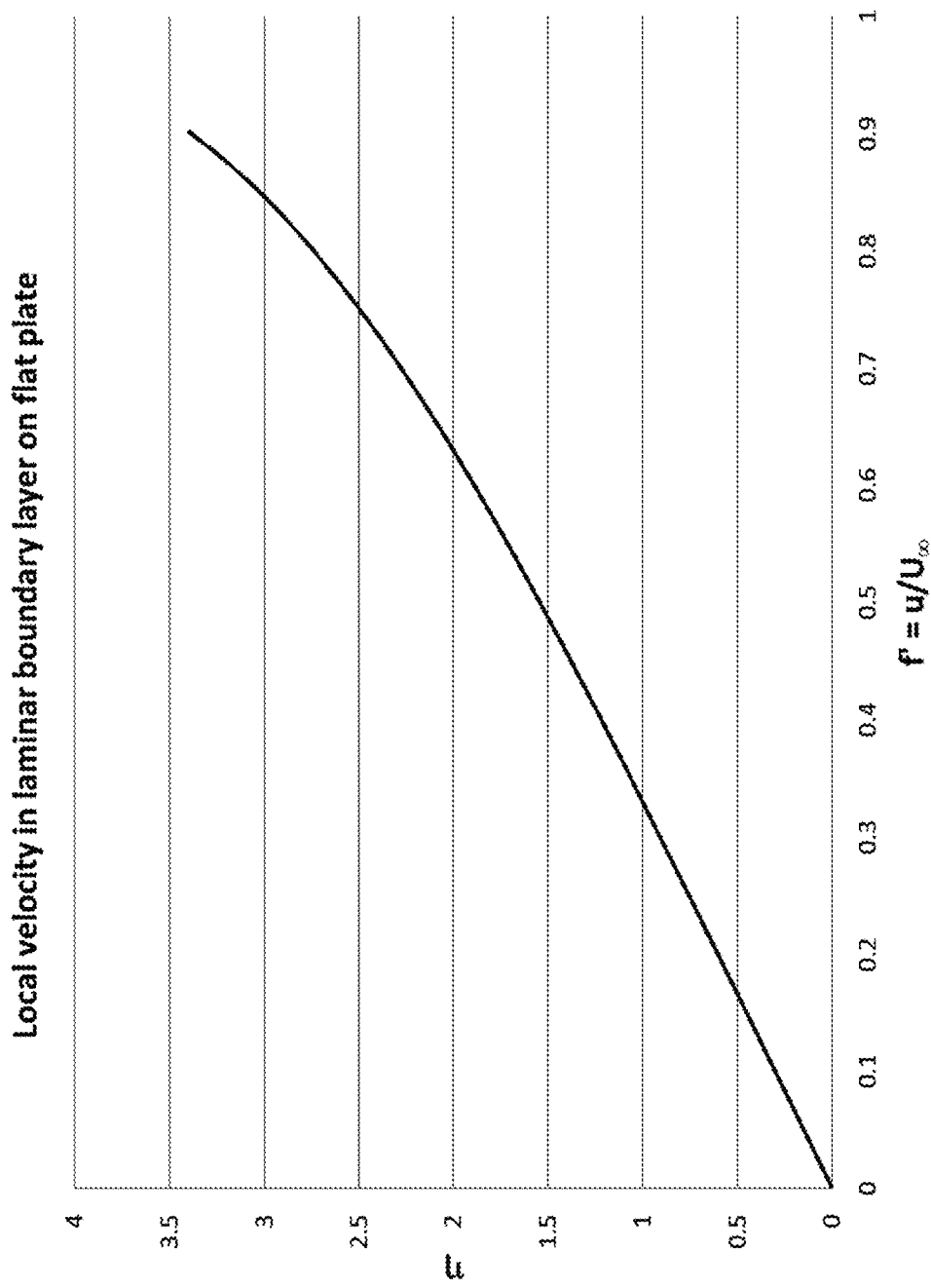
FIG. 33 is a graph showing local velocity distribution on a flat plate in a laminar boundary layer expressed in Blasius's variable $\eta$.

The local velocity distributions u/V versus $\eta$ is shown in FIG. 33. At the instability-to-intermittency transition location $x_{INTER}$, the ring diameter k and the dimensionless parameter at $\eta_T = k\sqrt{V/\nu x_{INTER}}$ can be obtained by iteration to satisfy $Re_k = 400$. The ordinarily skill artisan who reads the instant disclosure will readily understand the inventive methodology for obtaining annulus 100 size in terms of ring diameter k. The size of the present invention's annulus (e.g., ring wire) 100 varies with Re number, model size, and carriage speed. The size of roughness height k for a turbulent spot inducer 100 is selected based on the Blasius laminar BL velocity profile and a theoretical value of $Re_k = 400$, which is related to the model sizes and carriage speeds.

In contrast to the present invention, the sizes of turbulence stimulators used by Gertler (1950) for submarine model resistance tests were selected between 20 to 30 mesh sand for all models, without consideration of body geometry and Reynolds numbers. See M. Gertler, "Resistance Experiments on a Systematic Series of Streamlined Bodies of Revolution for Application to the Design of High-Speed Submarines," David Taylor Model Basin, Report C-297, April 1950.

Due to great differences in Reynolds numbers between full-scale vessels and model vessels, significant differences in BL characteristics and resistance are observed between a full-scale vessel and a model vessel. With reference to FIG. 34, conventional practice seeks to alleviate this scale effect on resistance by using turbulence stimulators, which have been extensively used for years in model tests in the marine industry for surface ships and submarines. The present inventors and others have investigated the technical problems associated with the classic methodology implementing turbulence stimulators.

The basic physical principle of a traditional "turbulence stimulator" is to place the turbulence simulator in a favorable pressure zone to force the flow to separate to generate a turbulent boundary layer. In contrast, the present invention places a "turbulent spot inducer" in an adverse pressure gradient zone to induce the occurrence of turbulent spots to grow into a turbulent BL through natural transition. The BL occurring naturally in full scale is simulated at model scale by the present invention of turbulent spot device. In contrast, the turbulent BL produced by the traditional turbulence stimulator is through flow separation, which is effected at model scale but is not expected in full scale.

A traditional turbulence stimulator is placed at a location at or about 5% from the body nose. The traditional location of the turbulence stimulator is routine and automatic, and does not take into consideration factors such as model sizes, Reynolds numbers, and BL characteristics associated with the model tests. In contrast, the present invention locates a turbulent spot inducer at the beginning of BL transition intermittency, which is related to model sizes, Reynolds numbers, and BL characteristics of model tests. The friction drag expected in full scale is properly simulated by inventive practice of a turbulent spot inducer.

A traditional turbulence stimulator, typically placed at 5% from the body nose in a favorable pressure gradient zone, will require large flow disturbance to generate turbulent BL. Hence, a traditional turbulence stimulator will produce a large parasitic drag, thus making residual drag more difficult to estimate. In contrast, the present invention's turbulent spot inducer is placed at an adverse pressure gradient, and only needs small flow disturbance to induce occurrence of turbulent spots. Hence, an inventive turbulent spot inducer will produce a small parasitic drag, thus making residual drag easier to estimate. Parasitic drag can be calculated using, for instance, Equations (1) and (2).

Accordingly, residual drag on an inventive model 1000 (which has an axisymmetric body 50 fitted with a turbulent spot inducer 1000) can be measured more accurately than residual drag on a traditional model (which has an axisymmetric body 50 fitted with a traditional turbulence stimulator). Inventive practice of model testing will afford greater accuracies of full-scale resistance determinations.

Scaling Formulas

Accordingly, design of an inventive model 1000 includes consideration of characteristics of a smooth axisymmetric body 50 as well as characteristics of a turbulent spot inducer 100 that is associated with the smooth axisymmetric body 50. The inventive ship model 1000 is fabricated in accordance with the design, and is tested in a towing carriage to obtain the model residual drag coefficient. The model residual drag coefficient thus obtained is used for full-scale resistance prediction.

Let $V_S$, $\rho$ and $S_A$ denote the ship speed, the fluid density, and the bare hull wetted surface area, respectively. Let $R_S$ denote the bare hull resistance and $C_{TS}$ the ship resistance coefficient given by $$C_{TS} = R_S/(1/2)\rho V_S^2 S_A, \qquad (5)$$

The subscript "S" denotes the parameters associated with a full scale ship. A traditional prediction method considers ship resistance to consist of friction drag and residual drag. Let $C_{FS}$ denotes the frictional drag coefficient associated with the shear stress along the ship body surface. Let $C_{RS}$ denotes the residual drag coefficient associated with the normal stress along the body surface. The ship resistance can be expressed by $$C_{TS} = C_{FS} + C_{RS} \qquad (6)$$

Based on the classic Froude method, the friction drag $C_{FS}$ is obtained from an equivalent flat plate friction drag such as Schoenherr friction line or ITTC 1957 friction line $C_{fS}$ with a multiplication of form factor $(1+F_S)$.

$$C_{FS} = (1+F_S) C_{fS} \qquad (7)$$

The form factor $(1+F_S)$ represents the effects of ship body thickness and ship hull boundary layer characteristics on body shear stress with respect to the shear stress on a flat plate. Furthermore, the form factor also incorporates the difference in laminar and turbulent boundary layer along the ship hull. A theory to compute form factors $(1+F_S)$ has been successfully derived recently on axisymmetric bodies by the aforementioned Shen, Hughes, and Gorski (2015). With the recently derived theory of $(1+F_S)$ and the Schoenherr friction line $C_{fS}$, the ship friction resistance $C_{FS}$ can be computed from Equation (7).

The residual resistance $C_{RS}$ is to be obtained from model tests with the following procedure. Let the subscript "M" denotes the parameters associated with a model. The model is tested in a towing carriage at a known carriage speed. The model resistance $C_{TM}$ is measured experimentally. The model friction drag $C_{FM}$ is computed from the Schoenherr friction line $C_{fM}$ and the model form factor $(1+F_M)$. With the computed model friction drag $C_{FM}$ and measured model drag $C_{TM}$, the model residual drag $C_{RM}$ is obtained by $$C_{RM} = C_{TM} - C_{FM} \qquad (8)$$

Once the model residual drag $C_{RM}$ is obtained, the full scale ship residual drag $C_{RS}$ is obtained by application of a scaling formula on model residual drag as follows, $$C_{RS} = f(C_{RM}) \qquad (9)$$

where $f(C_{RM})$ represents a function called scaling formula in the marine industry to relate the measured residual drag $C_{RM}$ from model tests to full scale residual drag $C_{RS}$ to be predicted.

In the current practice, two residual drag scaling formulas are widely used in the marine industry (Van Manen J. and P. van Oossanen 1988). The first conventional scaling method is based on two-dimensional extrapolation using a friction line. This scaling method assumes that the residual drag coefficient is invariant with Reynolds scale, and is used extensively in model tests for underwater craft such as submarines. The second conventional scaling method, sometimes called the "1+k" method, is based on three-dimensional extrapolation; this conventional scaling method is commonly used in the surface ship community. An informative paper is J. Gorski, M. Ebert, and L. Mulvihill, "Uncertainties in the Resistance Prediction of Underwater Vehicle," Proc. NATO AVT Symposium on Computational Uncertainty, Athens, Greece, December 2007.

The present inventors have identified the technical issues of the two aforementioned scaling methods, and have derived a new and improved scaling formula, as follows:

$$C_{RS} = C_{RM}\left(\frac{C_{FS}}{C_{FM}}\right) = C_{RM}\left[\frac{(1+F_S)C_{fS}}{(1+F_M)C_{fM}}\right] \qquad (10)$$

where $(1+F_S)$ and $(1+F_M)$ denote the form factors for full scale ship and the model, respectively (Shen et al. 2015; Gorski et al. 2007). The two conventional scaling formulae used extensively in the marine industry are shown to be subsets of the present invention's newly derived scaling formula of Equation (10).

Generally, in model testing of resistance and powering, the main objective is to obtain model residual drag $C_{RM}$. According to exemplary inventive practice, once the model residual drag $C_{RM}$ is obtained, the full scale residual drag $C_{RS}$ can be obtained from Equation (10). The ship resistance coefficient $C_{TS}$ can be predicted from Equations (7) and (10). The ship resistance can be computed from Equation (5).

The present invention, which is disclosed herein, is not to be limited by the embodiments described or illustrated herein, which are given by way of example and not of limitation. Other embodiments of the present invention will be apparent to those skilled in the art from a consideration of the instant disclosure, or from practice of the present invention. Various omissions, modifications, and changes to the principles disclosed herein may be made by one skilled in the art without departing from the true scope and spirit of the present invention, which is indicated by the following claims.

What is claimed is:

1. A method for making a vessel model suitable for hydrodynamic testing, the method comprising:
    providing an axisymmetric body;
    determining a boundary layer configuration for said axisymmetric body, wherein said determining of said boundary layer configuration includes identifying a delimitation between an instability region and an intermittency region;
    associating a turbulent spot inducer with said axisymmetric body, wherein said associating of said turbulent spot inducer includes situating said turbulent spot inducer at said delimitation between said instability region and said intermittency region.

2. The method for making a vessel model as recited in claim 1, wherein:
    said determining of said boundary layer configuration includes defining four adjacent regions;

said four adjacent regions include a laminarity region, said instability region, said intermittency region, and a turbulence region;
said instability region and said intermittency region together constitute a transition zone;
said transition zone is between said laminarity region and said turbulence region.

3. The method for making a vessel model as recited in claim 1, wherein said determining of said boundary layer configuration includes obtaining empirical data.

4. The method for making a vessel model as recited in claim 1, wherein said determining of said boundary layer configuration includes performing theoretical calculation.

5. The method for making a vessel model as recited in claim 1, wherein:
said turbulent spot inducer is formed by multiple objects coupled with said axisymmetric body so as to describe a ring shape encircling the circumference of said axisymmetric body;
said multiple objects are selected from the group consisting of granular objects and protrusive objects.

6. The method for making a vessel model as recited in claim 1, wherein said turbulent spot inducer is an annulus.

7. The method for making a vessel model as recited in claim 6, wherein said annulus is selected from the group consisting of:
an annulus characterized by a smooth surface;
an annulus characterized by a rough surface;
an annulus characterized by a jagged edge;
an annulus characterized by plural projections.

8. A method for conducting hydrodynamic model testing, the method comprising:
providing a vessel model that includes a smooth axisymmetric body and a turbulent spot inducer, said turbulent spot inducer generally describing a ring shape and circumferentially adjoining said smooth axisymmetric body in a boundary layer transition zone located axially between a laminar region and a turbulent region, said turbulent spot inducer being situated in said boundary layer transition zone at a demarcation located axially between an unstable boundary layer region and an intermittent boundary layer region;
causing said vessel model to move through water in a hydrodynamic test facility, wherein during said movement of said vessel model through said water said turbulent spot inducer increases generation of turbulent spots in said intermittent region, said turbulent spot inducer thereby decreasing or minimizing an axial extent of said intermittent region and increasing an axial extent of said turbulent region.

9. The method for conducting hydrodynamic model testing as recited in claim 8, wherein:
said laminar region is adjacent to and axially forward of said unstable region;
said unstable region is adjacent to and axially forward of said intermittent region;
said intermittent region is adjacent to and axially forward of said turbulent region.

10. The method for conducting hydrodynamic model testing as recited in claim 8, the method further comprising:
collecting resistance data pertaining to said movement of said vessel model through said water;
scaling said resistance data for applicability to a full-scale vessel.

11. The method for conducting hydrodynamic model testing as recited in claim 8, wherein said turbulent spot inducer is one of:
an annular structure having a smooth surface;
an annular structure having an unsmooth surface;
an annular structure having an uneven edge.

12. The method for conducting hydrodynamic model testing as recited in claim 8, wherein said turbulent spot inducer includes at least one of:
an annular structure;
an aggregation of granules;
an array of protuberances.

13. A hydrodynamic model test method comprising:
making a vessel model, said making of said vessel model including combining a smooth axisymmetric body and a turbulent spot inducer whereby, in a boundary layer transition zone of said smooth axisymmetric body, said turbulent spot inducer encircles said smooth axisymmetric body so as to delineate between a boundary layer instability region of said smooth axisymmetric body and a boundary layer intermittency region of said smooth axisymmetric body, said boundary layer transition zone separating a boundary layer laminarity region of said smooth axisymmetric body and a boundary layer turbulence region of said smooth axisymmetric body;
testing said vessel model in a vessel model basin so that during said testing of said vessel model said turbulent spot inducer induces creation of turbulent spots in said boundary layer intermittency region, said turbulent spot inducer thereby diminishing said boundary layer intermittency region and augmenting said boundary layer turbulence region.

14. The hydrodynamic model test method of claim 13, wherein:
said smooth axisymmetric body is characterized by a length, a forward end, and an aft end;
said boundary layer laminarity region begins at said forward end of said smooth axisymmetric body;
said boundary layer laminarity region is axially-longitudinally next to and forward of said boundary layer instability region;
said boundary layer instability region is axially-longitudinally next to and forward of said boundary layer intermittency region;
said boundary layer intermittency region is axially-longitudinally next to and forward of said boundary layer turbulence region;
said boundary layer turbulence region ends at said aft end of said smooth axisymmetric body.

15. The hydrodynamic model test method of claim 13 further comprising obtaining resistance data for said vessel model and applying said resistance data to a full-scale vessel.

16. The hydrodynamic model test method of claim 13, wherein said turbulent spot inducer includes at least one of:
a wire;
a Hama strip;
a sand strip;
granulation;
plural projections.

* * * * *